(12) United States Patent
Palmer et al.

(10) Patent No.: US 9,551,162 B2
(45) Date of Patent: Jan. 24, 2017

(54) METHOD FOR WATER TREATMENT

(75) Inventors: Ross Leslie Palmer, Queensland (AU); Stuart Bruce Anderson, Queensland (AU)

(73) Assignee: ZODIAC GROUP AUSTRALIA PTY LTD., Smithfield (AU)

( * ) Notice: Subject to any disclaimer, the term of this patent is extended or adjusted under 35 U.S.C. 154(b) by 422 days.

(21) Appl. No.: 13/695,252

(22) PCT Filed: Apr. 29, 2011

(86) PCT No.: PCT/AU2011/000502
§ 371 (c)(1),
(2), (4) Date: Mar. 8, 2013

(87) PCT Pub. No.: WO2011/134024
PCT Pub. Date: Nov. 3, 2011

(65) Prior Publication Data
US 2013/0161267 A1 Jun. 27, 2013

(30) Foreign Application Priority Data
Apr. 29, 2010 (AU) .................. 2010901808

(51) Int. Cl.
| C02F 1/66 | (2006.01) |
| E04H 4/12 | (2006.01) |
| C02F 1/68 | (2006.01) |
| C02F 103/42 | (2006.01) |
| C02F 1/52 | (2006.01) |

(52) U.S. Cl.
CPC .............. *E04H 4/1209* (2013.01); *C02F 1/68* (2013.01); *C02F 1/5236* (2013.01); *C02F 2103/42* (2013.01); *C02F 2303/22* (2013.01)

(58) Field of Classification Search
CPC ................. C02F 5/08; C02F 1/66; C02F 1/72; C02F 1/68; C02F 1/76; C01B 15/08; C01B 11/00; C11D 3/04; C11D 17/08
USPC ..... 210/749, 743, 697, 765, 198.1; 205/742; 510/161, 181, 218, 238, 405; 252/186.21, 252/186.32, 186.27, 189.34, 186.35, 252/186.36, 186.1; 504/127, 150
See application file for complete search history.

(56) References Cited

U.S. PATENT DOCUMENTS

| 3,616,355 | A | 10/1971 | Gwynn et al. | |
|---|---|---|---|---|
| 4,100,052 | A | 7/1978 | Stillman | |
| 4,255,246 | A | 3/1981 | Davis et al. | |
| 4,256,554 | A | 3/1981 | Bjorkman | |
| 4,361,471 | A | 11/1982 | Kosarek | |
| 4,790,923 | A | 12/1988 | Stillman | |
| 4,997,540 | A | 3/1991 | Howlett | |
| 5,045,211 | A * | 9/1991 | Hamilton | C02F 5/08 134/27 |
| 5,314,589 | A | 5/1994 | Hawley | |
| 6,071,417 | A * | 6/2000 | Adachi | 210/723 |
| 6,638,422 | B1 | 10/2003 | Schwartzkopf | |
| 2003/0080069 | A1 | 5/2003 | Coffey | |
| 2003/0155549 | A1 | 8/2003 | Yoshikawa et al. | |
| 2004/0084383 | A1 | 5/2004 | Zhou et al. | |
| 2006/0016765 | A1 | 1/2006 | DiPietro et al. | |
| 2006/0163085 | A1* | 7/2006 | Hanaoka | 205/742 |
| 2007/0193958 | A1* | 8/2007 | Martin | 210/749 |
| 2008/0230094 | A1 | 9/2008 | Zhou et al. | |
| 2010/0234262 | A1* | 9/2010 | Smith et al. | 510/161 |
| 2012/0267257 | A1 | 10/2012 | Palmer et al. | |
| 2013/0161267 | A1 | 6/2013 | Palmer et al. | |
| 2013/0270193 | A1 | 10/2013 | Palmer et al. | |
| 2014/0212512 | A1 | 7/2014 | Palmer | |

FOREIGN PATENT DOCUMENTS

| EP | 0470841 | 2/1992 |
|---|---|---|
| EP | 1602629 | 1/2008 |
| ES | 2155372 | 5/2001 |
| ES | 2224788 | 3/2005 |
| JP | 5165082 | 6/1976 |
| JP | 09201132 | 8/1997 |
| JP | 2003053346 | 2/2003 |
| JP | 2003103266 | 4/2003 |
| WO | 97/40246 A1 | 10/1997 |
| WO | 9907636 | 2/1999 |
| WO | 03040038 | 5/2003 |
| WO | 03073848 | 9/2003 |
| WO | 2004031077 | 4/2004 |
| WO | 2004080901 | 9/2004 |
| WO | 2006049811 | 5/2006 |
| WO | 2008/000029 A1 | 1/2008 |
| WO | WO 2008000029 A1 * | 1/2008 |

OTHER PUBLICATIONS

Serinel Samuel, Australian Patent Office, "International Search Report" in connection with corresponding PCT Patent Application No. PCT/AU2011/000502, Jun. 17, 2011, 3 pages.

Serinel Samuel, Australian Patent Office, "Written Opinion of the International Searching Authority" in connection with corresponding PCT Patent Application No. PCT/AU2011/000502, Jun. 17, 2011, 4 pages.

U.S. Appl. No. 13/270,554, Appeal Brief, Mar. 26, 2015, 69 pages.
U.S. Appl. No. 13/270,554, Advisory Action, mailed Dec. 9, 2014, 3 pages.

(Continued)

*Primary Examiner* — Walter D Griffin
*Assistant Examiner* — Cameron Allen
(74) *Attorney, Agent, or Firm* — Dean W. Russell; Kilpatrick Townsend & Stockton LLP

(57) ABSTRACT

A method for treating a swimming pool, including introducing $Mg^{2+}$ to a level from 60 ppm to 300 ppm to the swimming pool by addition of a soluble magnesium compound to the swimming pool, or $Mg^{2+}$ to a level from 60 ppm to 1000 ppm by addition of a magnesium halide in addition to a further soluble magnesium compound.

17 Claims, No Drawings

(56) References Cited

OTHER PUBLICATIONS

U.S. Appl. No. 13/270,554, Amendment and Response to Final Office Action, Dec. 1, 2014, 18 pages.
U.S. Appl. No. 13/270,554, Final Office Action, mailed Sep. 30, 2014, 10 pages.
U.S. Appl. No. 13/270,554, Amendment and Response to Non-Final Office Action, Jun. 24, 2014, 13 pages.
U.S. Appl. No. 13/270,554, Non-Final Office Action, mailed Dec. 26, 2013, 10 pages.
U.S. Appl. No. 13/512,591, Final Office Action, mailed Nov. 20, 2014, 13 pages.
U.S. Appl. No. 13/512,591, Amendment and Response to Non-Final Office Action, Oct. 3, 2014, 16 pages.
U.S. Appl. No. 13/512,591, Non-Final Office Action, mailed Jun. 4, 2014, 12 pages.
U.S. Appl. No. 13/512,591, Amendment and Response to Restriction Requirement, Mar. 31, 2014, 7 pages.
U.S. Appl. No. 13/512,591, Restriction Requirement, mailed Feb. 27, 2014, 6 pages.
U.S. Appl. No. 14/131,451, Non-Final Office Action, mailed May 14, 2015, 11 pages.
International Patent Application No. PCT/AU2010/001612, International Search Report, mailed Jan. 6, 2011, 3 pages.
International Patent Application No. PCT/AU2012/000831, International Search Report, mailed Sep. 18, 2012, 4 pages.
Wright, et al., "An Introduction to Aqueous Electrolyte Solutions," John Wiley and Sons, 2007, pp. 429-433.
Australian Patent Application No. 2010324553; Australian Examination Report mailed Jan. 6, 2014; 2 pages.
European Patent Application No. 11 774 205.6; European Examination Report mailed Aug. 13, 2015, 3 pages.
European Patent Application No. 11 774 205.6; European Supplementary Search Report mailed Oct. 1, 2013, 2 pages.
U.S. Appl. No. 13/270,554, Non-Final Office Action mailed Sep. 25, 2015, 12 pages.
International Patent Application No. PCT/AU2007/000893; International Search Report and Written Opinion mailed Aug. 17, 2007; 6 pages.
Encyclopedia of Chemical Technology, third edition, 19810101, vol. 14, p. 624, 1981, 4 pages.

\* cited by examiner

METHOD FOR WATER TREATMENT

FIELD OF THE INVENTION

This invention relates to a method for treating water in swimming pools, spas and similar bodies of water.

The invention is concerned with a method for treating water in swimming pools by introducing magnesium ions.

The invention is particularly concerned with a method that introduces magnesium ions from one or more soluble magnesium compounds to swimming pools to thereby provide improved environmental, aesthetic and therapeutic benefits compared to conventional systems.

BACKGROUND OF THE INVENTION

Swimming pool water must undergo treatment in order to remain clear, clean, free from pathogens, and suitable for use by bathers. Swimming pools (also referred to herein as "pools") chlorinated by the introduction of sodium or calcium hypochlorite contain high levels of dissolved salts in the form of sodium or calcium anions whereas conventional salt chlorinated pools contain high levels of sodium chloride, typically in a recommended concentration of about 6000 ppm.

Apart from very high salt concentrations, pool water can also contain chloramine or trihalomethane (THM) compounds arising from the reaction of free chlorine cations with bodily fluids, skin, and other contaminants in the pool water as well as cyanuric acid chlorine stabilizers and micro organisms such as bacteria, viruses, algae and parasites. The levels of these contaminants are higher in non-residential pools with a large number of bathers which increases the levels of chlorine required to keep these pools clean. This leads to extended periods of "superchlorination", during which the pool cannot be used. The presence of chloramines and trihalomethanes in swimming pools is harmful to humans since these compounds are the underlying cause of a number of serious health problems including forgetfulness, fatigue, chronic colds, voice problems, eye irritations, headache, sore throat, eczema and frontal sinus inflammation. These toxic compounds are also the precursors of vital health concerns such as asthma, cancer, and reproductive defects, making their presence in pools highly undesirable.

Pools using electrolytic generators typically contain between 3000 and 6000 ppm of sodium chloride (NaCl) as these are the levels required for the electrolytic chlorinators to work efficiently. The presence of such high salt contents in the backwash and rinse water makes it unsuitable for collection and use in garden irrigation because gradual accumulation of sodium chloride in the soil leads to problems such as salinity induced soil degradation.

Furthermore, the fact that many swimming pools contain high levels of phosphates, which act as a primary source of nutrition for algae, has increased the levels of sanitizers required to maintain satisfactory control of algae and adequate water clarity.

As used herein, the expression "swimming pool" is also intended to embrace the analogous use of spa baths, hot tubs and the like which are operated in a substantially identical manner to swimming pools.

BRIEF DESCRIPTION OF THE INVENTION

Accordingly, it is an aim of the present, invention to provide a method for water treatment that will mitigate one or more of the problems of prior art swimming pools, spas and the like and otherwise to give consumers a convenient choice.

The present has arisen after the inventors unexpectedly discovered that the addition of specific levels of magnesium ions (i.e. $Mg^{2+}$) to a swimming pool is associated with a range of environmental and therapeutic benefits. The inventors have also found that the $Mg^{2+}$ may be introduced into the swimming pool water using a range of different magnesium compounds, or combinations thereof, while achieving significant environmental, aesthetic and therapeutic benefits.

Advantages of introducing $Mg^{2+}$ to swimming pools include the ability of $Mg^{2+}$ to tact as a flocculant that binds dissolved algal nutrients (e.g. phosphate) resulting in a swimming pool with crystal clear water. Further advantages of adding $Mg^{2+}$ to swimming pools and spas include the ability of $Mg^{2+}$ to bind carbonate resulting in reduced dependence on calcium ions (i.e. $Ca^{2+}$) as water hardness ions and reduced formation of insoluble calcium carbonate scale. Moreover, the addition of $Mg^{2+}$ to swimming pool water has resulted in a significant reduction in dry skin and eye conditions compared to when traditional pool chemicals (e.g. NaCl) are being used. The inventors have also discovered that the introduction of other salts, including potassium chloride (KCl), may in some particular embodiments enhance the beneficial effects of introducing $Mg^{2+}$ to swimming pool water.

In one aspect, the invention provides a method for treating a swimming pool, the method including the step of introducing $Mg^{2+}$ to a minimum level of 60 ppm and a maximum level of 300 ppm to said swimming pool.

In another aspect, the invention provides a method for treating a swimming pool, said method including the step of introducing $Mg^{2+}$ to a minimum level of 60 ppm and a maximum level of 1000 ppm to said swimming pool by addition of a magnesium halide and at least one other soluble magnesium compound to said swimming pool.

In still a further aspect, the invention provides additionally including the step of introducing 1 to 4000 ppm of a soluble potassium salt to the swimming pool.

Preferably, the $Mg^{2+}$ levels range from 80 ppm to 500 ppm.

More preferably, the $Mg^{2+}$ levels range from 100 ppm to 400 ppm.

Even more preferably, the $Mg^{2+}$ levels range from 120 ppm to 380 ppm.

In one embodiment, the $Mg^{2+}$ comes from a soluble magnesium compound selected from the group consisting of magnesium sulphate, magnesium chloride, magnesium bromide, magnesium fluoride, magnesium iodide, magnesium borate, magnesium hydroxide, magnesium oxide, or a combination thereof.

Suitably, 150 ppm to 6000 ppm of the one or more soluble magnesium compounds is introduced to the swimming pool.

Preferably, the method is suitable for treating electrolysed and/or non electrolysed (e.g. hand dosed) swimming pools.

Suitably, in an electrolysed swimming pool, the $Mg^{2+}$ is formed from the one or more soluble magnesium compounds by way of electrolysis.

Typically, although not exclusively, a non electrolysed swimming pool requires at least partly reduced $Mg^{2+}$ levels compared to an electrolysed swimming pool.

In one particular embodiment, the soluble magnesium compound is anhydrous magnesium sulphate or magnesium sulphate heptahydrate.

Preferably, according to this particular embodiment, 300 ppm to 3000 ppm of anhydrous magnesium sulphate is introduced to the swimming pool.

More preferably, according to this particular embodiment, 400 ppm to 2200 ppm of anhydrous magnesium sulphate is introduced to the swimming pool.

Preferably, according to this particular embodiment, 800 ppm to 5000 ppm of magnesium sulphate heptahydrate is introduced to the swimming pool.

More preferably, according to this particular embodiment, 900 ppm to 4200 ppm of magnesium sulphate heptahydrate is introduced to the swimming pool.

In another particular embodiment, the soluble magnesium compound is magnesium hydroxide or magnesium oxide.

Preferably, according to this particular embodiment, 160 ppm to 1400 ppm of magnesium hydroxide is introduced to the swimming pool.

More preferably, according to this particular embodiment, 200 ppm to 1200 ppm of magnesium hydroxide is introduced to the swimming pool.

Preferably, according to this particular embodiment, 120 ppm to 900 ppm of magnesium oxide is introduced to the swimming pool.

More preferably, according to this particular embodiment, 150 ppm to 750 ppm of magnesium oxide is introduced to the swimming pool.

Suitably, according to this particular embodiment, the magnesium hydroxide or magnesium oxide is formulated as an aqueous slurry or paste as a solution.

Suitably, according to this particular embodiment, the magnesium hydroxide or magnesium oxide is introduced to the swimming pool as a continuous solution.

In yet another particular embodiment, the soluble magnesium compound is anhydrous magnesium chloride or magnesium chloride hexahydrate.

Preferably, according to this particular embodiment, 250 ppm to 2500 ppm of anhydrous magnesium chloride is introduced to the swimming pool.

More preferably, according to this particular embodiment, 350 ppm to 1750 ppm of anhydrous magnesium chloride is introduced to the swimming pool.

Preferably, according to this particular embodiment, 500 ppm to 4000 ppm of magnesium chloride hexahydrate is introduced to the swimming pool.

More preferably, according to this particular embodiment, 700 ppm to 3500 ppm of magnesium chloride hexahydrate is introduced to the swimming pool.

In some embodiments, the swimming pool is treated by introducing a composition including $Mg^{2+}$ and/or one or more soluble magnesium compounds in increments.

Suitably, according to these embodiments, the composition including $Mg^{2+}$ and/or the one or more soluble magnesium compounds may be mixed with water into a concentrated solution and introduced to the swimming pool to replace at least a portion of the water in a swimming pool that does not contain $Mg^{2+}$ and/or a swimming pool that is in the process of being converted to a swimming pool comprising magnesium.

In one preferred form, the swimming pool is a hand dosed pool.

In another preferred form, the swimming pool comprises a chlorinator.

In one particular embodiment, the composition comprising $Mg^{2+}$ and/or the one or more soluble magnesium compounds is a Carnallite composition.

In one embodiment, 0 to 4000 ppm of a soluble potassium halide salt is introduced to the swimming pool.

Preferably, 0 to 3000 ppm of the soluble potassium halide salt is introduced to the swimming pool.

More preferably, 0 to 2500 ppm of the soluble potassium halide salt is introduced to the swimming pool.

In another embodiment, 250 ppm to 4000 ppm of a soluble sodium halide salt is introduced to the swimming pool.

Preferably, 375 ppm to 2000 ppm of the soluble sodium halide salt is introduced to the swimming pool.

In some particular embodiments, one or more hypochlorite compounds selected from the group consisting of sodium hypochlorite, calcium hypochlorite, magnesium hypochlorite, potassium hypochlorite and lithium hypochlorite are introduced to the swimming pool.

Preferably, according to these particular embodiments, the one or more hypochlorite compounds are introduced to the swimming pool in the form of a tablet or a liquid.

Preferably, according to these particular embodiments, said one or more hypochlorite compounds are introduced to a swimming pool including one or more magnesium compounds and/or a potassium halide salt.

DETAILED DESCRIPTION

This invention relates to an improved method for treating water that was developed after the inventors surprisingly found that the introduction of specific levels of magnesium ions (i.e. $Mg^{2+}$) to a swimming pool is associated with a range of environmental, aesthetic and therapeutic benefits. The inventors also discovered that the $Mg^{2+}$ added to the swimming pool may come from a range of different magnesium compounds, or combinations thereof, with no deleterious effects on pool water hygiene.

Advantages of adding $Mg^{2+}$ to swimming pools include lower use of chemicals with resulting cost savings, reduced environmental pollution, reduced phosphate levels, improved water clarity, a reduction in dry skin and eye conditions, and significant health benefits due to considerably lower levels of disinfection by-products (DBPs) including chloramines and trihalomethanes. Another advantage is that the $Mg^{2+}$ may be formulated as a solution and added to the swimming pool as a continuous solution without affecting the taste and odour of the water.

In some embodiments, the $Mg^{2+}$ may be introduced into the swimming pool water in combination with one or more chloride ion ($Cl^-$) containing compounds, such as potassium chloride and sodium chloride, which may be particularly advantageous when swimming pools with electrolytic chlorinators are being employed.

The invention will primarily be described with reference to its use to provide treatment of swimming pool and spa water containing bacteria, algae and other water-borne diseases, but it should be remembered that the invention can have broader applications to any other body of water which may contain such organisms and diseases and which therefore require treatment.

Given that high sodium levels and unacceptably high levels of DBPs are still present in most swimming pools, the present invention seeks to utilize a variety of sources of magnesium ions, which can provide and maintain effective magnesium levels in the swimming pool water, to give consumers a convenient alternative to conventional pool chemicals.

In one aspect, the invention therefore provides a method of treating a swimming pool, said method including the step of introducing $Mg^{2+}$ to a minimum level of 60 ppm and a maximum level of 1000 ppm.

In particular aspects, the level of $Mg^{2+}$ may be 100 ppm, 140 ppm, 180 ppm, 220 ppm, 260 ppm, 300 ppm, 340 ppm, 380 ppm, 420 ppm, 460 ppm, 500 ppm, 540 ppm, 580 ppm, 620 ppm, 660 ppm, 700 ppm, 740 ppm, 780 ppm, 820 ppm, 860 ppm, 900 ppm, 940 ppm, or up to 1000 ppm.

Preferably, the level of $Mg^{2+}$ is 80 ppm to 500 ppm.

For example, the level of $Mg^{2+}$ may be 90 ppm, 110 ppm, 130 ppm, 150 ppm, 170 ppm, 190 ppm, 210 ppm, 230 ppm, 250 ppm, 270 ppm, 290 ppm, 310 ppm, 330 ppm, 350 ppm, 370 ppm, 390 ppm, 410 ppm, 430 ppm, 450 ppm, 470 ppm, 490 ppm, or up to 500 ppm.

More preferably, the level of $Mg^{2+}$ is 100 ppm to 400 ppm.

It will be appreciated that these $Mg^{2+}$ levels may also be referred to as 0.1 g/l to 0.4 g/l of $Mg^{2+}$ or 0.00411 mol/l to 0.01646 mol/l of $Mg^{2+}$.

For example, the level of $Mg^{2+}$ may be 105 ppm, 115 ppm, 125 ppm, 135 ppm, 145 ppm, 155 ppm, 165 ppm, 175 ppm, 185 ppm, 195 ppm, 205 ppm, 215 ppm, 225 ppm, 235 ppm, 245 ppm, 255 ppm, 265 ppm, 275 ppm, 285 ppm, 295 ppm, 305 ppm, 315 ppm, 325 ppm, 335 ppm, 345 ppm, 355 ppm, 365 ppm, 375 ppm, 385 ppm, 395 ppm, or up to 400 ppm.

Even more preferably, the level of $Mg^{2+}$ is 120 ppm to 380 ppm.

Accordingly, the level of $Mg^{2+}$ may be 160 ppm, 200 ppm, 240 ppm, 280 ppm, 320 ppm, 360 ppm, or up to 380 ppm.

Suitably, the $Mg^{2+}$ comes from a soluble magnesium compound selected from the group consisting of magnesium sulphate, magnesium chloride, magnesium bromide, magnesium fluoride, magnesium iodide, magnesium borate, magnesium hydroxide, magnesium oxide, or a combination thereof.

Preferably, the level of the one or more soluble magnesium compounds introduced to the swimming pool is 150 ppm to 6000 ppm.

Preferably, the method is suitable for treating electrolysed and/or non electrolysed (e.g. hand dosed) swimming pools.

Suitably, in electrolysed swimming pools, the $Mg^{2+}$ is formed from the one or more soluble magnesium compounds by way of electrolysis.

It will be appreciated that a non electrolysed swimming pool may not require as high $Mg^{2+}$ levels as an electrolysed swimming pool. As a result similar benefits may in some cases be achieved at a lower cost.

For example, the level of the one or more soluble magnesium compounds may be 450 ppm, 750 ppm, 1050 ppm, 1350 ppm, 1650 ppm, 1950 ppm, 2250 ppm, 2550 ppm, 2850 ppm, 3150 ppm, 3450 ppm, 3750 ppm, 4050 ppm, 4350 ppm, 4650 ppm, 4950 ppm, 5250 ppm, 5550 ppm, 5850 ppm, or up to 6000 ppm.

Suitably, the level of the one or more soluble magnesium compounds introduced to the swimming pool is 0.00411 mol/l to 0.01646 mol/l or 0.1 g/l or 0.4 g/l.

In one particular embodiment, the soluble magnesium compound is anhydrous magnesium sulphate or magnesium sulphate heptahydrate.

A skilled person will appreciate that the chemical formula for anhydrous magnesium sulphate is $MgSO_4$, while the chemical formula for magnesium sulphate heptahydrate is $MgSO_4 \cdot 7H_2O$ and that higher levels will be required when the latter is used due to its higher water content.

Preferably, according to this particular embodiment, 300 ppm to 3000 ppm of anhydrous magnesium sulphate is introduced to the swimming pool.

Accordingly, the level of anhydrous magnesium sulphate may be 500 ppm, 700 ppm, 900 ppm, 1100 ppm, 1300 ppm, 1500 ppm, 1700 ppm, 1900 ppm, 2100 ppm, 2300 ppm, 2500 ppm, 2700 ppm, 2900 ppm, or up to 3000 ppm.

More preferably, according to this particular embodiment, 400 ppm to 2200 ppm of anhydrous magnesium sulphate is introduced to the swimming pool.

For example, the level of anhydrous magnesium sulphate may be 450 ppm, 550 ppm, 650 ppm, 750 ppm, 850 ppm, 950 ppm, 1050 ppm, 1150 ppm, 1250 ppm, 1350 ppm, 1450 ppm, 1550 ppm, 1650 ppm, 1750 ppm, 1850 ppm, 1950 ppm, 2050 ppm, 2150 ppm, or up to 2200 ppm.

Preferably, according to this particular embodiment, 800 ppm to 5000 ppm of magnesium sulphate heptahydrate is introduced to the swimming pool.

Accordingly, the level of magnesium sulphate heptahydrate may be 1200 ppm, 1400 ppm, 1600 ppm, 1800 ppm, 2000 ppm, 2200 ppm, 2400 ppm, 2600 ppm, 2800 ppm, 3000 ppm, 3200 ppm, 3400 ppm, 3600 ppm, 3800 ppm, 4000 ppm, 4200 ppm, 4400 ppm, 4600 ppm, 4800 ppm, or up to 5000 ppm.

More preferably, according to this particular embodiment, 900 ppm to 4200 ppm of magnesium sulphate heptahydrate is introduced to the swimming pool.

For example, the level of magnesium sulphate heptahydrate may be 1200 ppm, 1350 ppm, 1500 ppm, 1650 ppm, 1800 ppm, 1950 ppm, 2100 ppm, 2250 ppm, 2400 ppm, 2550 ppm, 2700 ppm, 2850 ppm, 3000 ppm, 3150 ppm, 3300 ppm, 3450 ppm, 3600 ppm, 3750 ppm, 3900 ppm, 4050 ppm, or up to 4200 ppm.

In another particular embodiment, the soluble magnesium compound is magnesium hydroxide or magnesium oxide.

Preferably, according to this particular embodiment, 160 ppm to 1400 ppm of magnesium hydroxide is introduced to the swimming pool is.

More preferably, according to this particular embodiment, 200 ppm to 1200 ppm of magnesium hydroxide is introduced to the swimming pool.

Preferably, according to this particular embodiment, 120 ppm to 900 ppm of magnesium oxide is introduced to the swimming pool.

More preferably, according to this particular embodiment, 150 ppm to 750 ppm of magnesium oxide is introduced to the swimming pool.

Preferably, according to this particular embodiment, the magnesium hydroxide or magnesium oxide is formulated as an aqueous slurry or paste as a solution.

Preferably, according to this particular embodiment, the magnesium hydroxide or magnesium oxide is introduced into the swimming pool as a continuous solution.

Suitably, according to this particular embodiment, the pH of the swimming pool water is kept within a specific range so as to avoid precipitation of magnesium hydroxide as a solid material.

Thus, the pH of the swimming pool water may be about 7.0, about 7.1, about 7.2, about 7.3, about 7.4, about 7.5, about 7.6 about 7.7, about 7.8, about 7.9, and up to about 8.0.

The introduction of $Mg^{2+}$ in the form of a continuous solution may be particularly advantageous in commercial swimming pools where aluminium ions (i.e. $Al^{3+}$) are commonly used as the flocculating agent as $Mg^{2+}$, in contrast to $Al^{3+}$, does not add an unpleasant taste or odour to the swimming pool water.

In yet another particular embodiment, the soluble magnesium compound is anhydrous magnesium chloride or magnesium chloride hexahydrate.

Preferably, according to this particular embodiment, 250 ppm to 2500 ppm of anhydrous magnesium chloride is introduced to the swimming pool.

Accordingly, the level of anhydrous magnesium chloride may be 500 ppm, 700 ppm, 900 ppm, 1100 ppm, 1300 ppm, 1500 ppm, 1700 ppm, 1900 ppm, 2100 ppm, 2300 ppm, or up to 2500 ppm.

More preferably, according to this particular embodiment, 350 ppm to 1750 ppm of anhydrous magnesium chloride is introduced to the swimming pool.

For example, the level of anhydrous magnesium chloride may be 450 ppm, 550 ppm, 650 ppm, 750 ppm, 850 ppm, 950 ppm, 1050 ppm, 1150 ppm, 1250 ppm, 1350 ppm, 1450 ppm, 1550 ppm, 1650 ppm, or up to 1750 ppm.

Preferably, according to this particular embodiment, 500 ppm to 4000 ppm of magnesium chloride hexahydrate is introduced to the swimming pool.

Accordingly, the level of magnesium chloride hexahydrate may be 600, 1200 ppm, 1400 ppm, 1600 ppm, 1800 ppm, 2000 ppm, 2200 ppm, 2400 ppm, 2600 ppm, 2800 ppm, 3000 ppm, 3200 ppm, 3400 ppm, 3600 ppm, 3800 ppm, and up to 4000 ppm.

More preferably, according to this particular embodiment, 700 ppm to 3500 ppm of magnesium chloride hexahydrate is introduced to the swimming pool.

For example, the level of magnesium chloride hexahydrate may be 850 ppm, 1050 ppm, 1200 ppm, 1350 ppm, 1500 ppm, 1650 ppm, 1800 ppm, 1950 ppm, 2100 ppm, 2250 ppm, 2400 ppm, 2550 ppm, 2700 ppm, 2850 ppm, 3000 ppm, 3150 ppm, 3300 ppm, or up to 3500 ppm.

In some embodiments, a composition comprising $Mg^{2+}$ and/or one or more soluble magnesium compounds is introduced to the swimming pool in increments (e.g. percentage increases).

Suitably, according to these embodiments, the composition comprising $Mg^{2+}$ and/or the one or more soluble magnesium compounds is initially introduced to the swimming pool at a higher $Mg^{2+}$ concentration to replace at least a portion of the water in a swimming pool that does not include $Mg^{2+}$ and/or a swimming pool that is in the process of being changed, transformed or otherwise converted to a swimming pool comprising magnesium.

In light of the foregoing, it will be appreciated that this incremental change, conversion or transition may be particularly suitable and/or convenient for a user who wishes to convert, change or otherwise transform a standard swimming pool (e.g. a saltwater, chlorine, ozone or ionized pool) to a pool comprising magnesium.

Accordingly, the composition comprising $Mg^{2+}$ and/or the one or more soluble magnesium compounds may be mixed with water into a concentrated solution and used to replace the swimming pool water in increments of about 5%, about 10%, about 20%, about 30%, about 40%, about 60%, or up to about 70%.

Preferably, the composition comprising $Mg^{2+}$ and/or the one or more soluble magnesium compounds is used to replace the swimming pool water in increments of about 20%, about 22%, about 24%, about 26%, about 28%, about 30%, about 32%, about 34%, about 36%, about 38%, or about 40%.

It will be appreciated that compositions that are introduced to a swimming pool in increments (e.g. to convert a saltwater or chlorine swimming pool to a swimming pool comprising magnesium) typically contain a higher level, concentration and/or percentage of magnesium compared to compositions that are introduced to swimming pools comprising higher levels of magnesium.

In one preferred form, the swimming pool is a hand dosed pool.

In another preferred form, the swimming pool comprises a chlorinator.

In one particular embodiment, the composition comprising $Mg^{2+}$ and/or the one or more soluble magnesium compounds is a Carnallite composition.

It will be appreciated that the Carnallite composition may be dehydrated (anhydrous), partly dehydrated or hydrated.

In some embodiments, 0 to 4000 ppm of a soluble potassium halide salt is introduced to the swimming pool.

Accordingly, the level of the soluble potassium halide salt may be 500 ppm, 1000 ppm, 1500 ppm, 2000 ppm, 2500 ppm, 3000 ppm, 3500 ppm, or up to 4000 ppm.

Preferably, 0 to 3000 ppm of the soluble potassium halide salt is introduced to the swimming pool.

More preferably, 0 to 2500 ppm of the soluble potassium halide salt is introduced to the swimming pool.

In certain embodiments, 250 ppm to 4000 ppm of a soluble sodium halide salt is introduced to the swimming pool.

Accordingly, the level of the soluble sodium halide salt may be 500 ppm, 750 ppm, 1000 ppm, 1250 ppm, 1500 ppm, 1750 ppm, 2000 ppm, 2250 ppm, 2500 ppm, 2750 ppm, 3000 ppm, 3250 ppm, 3500 ppm, 3750 ppm, or up to 4000 ppm.

Preferably, 375 ppm to 2000 ppm of the soluble sodium halide salt is introduced to the swimming pool.

Thus, the level of the soluble sodium halide salt may be 750 ppm, 1125 ppm, 1500 ppm, 1875 ppm, or up to 2000 ppm.

Preferably, said potassium halide and sodium halide salts are chloride salts.

In some particular embodiments, one or more hypochlorite compounds selected from the group consisting of sodium hypochlorite, calcium hypochlorite, magnesium hypochlorite, potassium hypochlorite and lithium hypochlorite are introduced to the swimming pool.

Suitably, the one or more hypochlorite compounds are introduced to the swimming pool in the form of a tablet or a liquid.

Preferably, according to these particular embodiments, the one or more hypochlorite compounds are introduced to a swimming pool that comprises one or more magnesium compounds and/or a potassium halide salt.

Thus, the one or more hypochlorite compounds may be introduced to a non-electrolysed swimming pool comprising $MgCl_2$ and KCl.

According to another aspect of the invention, there is provided a composition for use with the aforementioned method, said composition comprising:

| | |
|---|---|
| Mg compound | 100-10 wt % |
| KCl | 0-70 wt % |
| NaCl | 0-60 wt % |

Accordingly, said composition may comprise 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt %, or up to 100 wt % of a magnesium compound selected from the group consisting of magnesium sulphate, magnesium chloride, magnesium bromide, magnesium fluoride, magnesium iodide, magnesium borate, magnesium hydroxide, magnesium oxide, or a combination thereof.

It will be appreciated that the magnesium sulphate may be in the form of anhydrous magnesium sulphate or magnesium heptahydrate.

It will also be appreciated that the magnesium chloride may be in the form of anhydrous magnesium chloride or magnesium chloride hexahydrate.

Furthermore, said composition may comprise 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, or up to 70 wt % of KCl.

It will also be appreciated that said composition may comprise 5 wt %, 10 wt %, 15 wt %, 20 wt %, 25 wt %, 30 wt %, 35 wt %, 40 wt %, 45 wt %, 50 wt %, 55 wt %, or up to 60 wt % of NaCl.

In one preferred form, the magnesium compound is anhydrous magnesium sulphate or magnesium heptahydrate.

In another preferred form, the magnesium compound is a combination of magnesium sulphate and magnesium chloride.

Suitably, said composition comprises a concentrated aqueous solution.

Magnesium is widely marketed as a complementary medicine as being linked to vital health functions including neurotransmission, normal heart rhythms, proper muscle functions, normal protein synthesis and carbohydrate metabolism, proper operation of over 300 enzymes and helping the absorption of calcium and potassium. In terms of recommended daily intake (RDI), the World Health Organization (WHO) proposes 450 mg per day for pregnant women and nursing mothers and 300 mg for all others. Insufficient magnesium levels have been linked to dysfunctions ranging from muscular spasms and anxiety through to kidney stones, cardiac arrhythmia and a host of disorders of the immune system. Moreover, commonly consumed liquids such as coffee, tea and alcohol deplete our bodies of magnesium further increasing the levels of magnesium required for a healthy lifestyle.

It is also reported that magnesium containing solutions can be utilized both topically and as an antiseptic and orally as an immuno-stimulant in disease treatment. Numerous studies report good results in treatment of a wide range of ailments, in particular, skin diseases (e.g. eczema and psoriasis) and diseases of allergic origin. Anecdotal evidence suggests that the use of magnesium and/or potassium salts in a spa bath results in the formation of "silky water" that forms a moisturising layer on top of the skin which provides relief to an eczema sufferer.

A significant advantage of treating water in swimming pools with $Mg^{2+}$ is its flocculation capacity.

Flocculation is a process whereby particles suspended in the water are attracted to the flocculating agent and bound to it. This forms larger particles that will cease to be suspended in the water. These combined particles or "flocs" can be filtered from the water more easily than the original suspended particles. Magnesium is a multi-valent positive ion, and can attract multiple suspended particles. Organic molecules tend to have a slight negative "dipole" due to the functional groups attached to the hydrocarbon base structure (which has no dipole charge). The slight-negative charge on the outer surface of organic molecules are attracted to the strong positive charge of the magnesium ions, leading to the formation of flocs of multiple organic molecules surrounding the small strongly charged magnesium ion. These flocs become too large and heavy to be suspended in the water and also larger than their component molecules for the purposes of filtration.

In the pool, flocs can be filtered out as the water is cycled through a pool filtration system. This leads to cleaner water, since particles that would have bypassed the filter previously will be filtered out now that they are part of larger structures.

In a collection/settling tank, the flocs will have time to settle at the bottom of the tank (below the outlet point). This will help to raise the water quality of the collected water and to reduce available nutrients for micro-organisms in the water. A collection tank is for collection of waste water from a swimming pool for conservation reasons may also serve as a settling tank.

Although not wishing to be bound by any particular hypothesis, it is considered that magnesium ions ($Mg^{2+}$) bind $PO_4^{3-}$, resulting in the formation of an insoluble complex that sinks to the bottom of the pool and can easily be vacuumed up. The magnesium phosphate complex may be monobasic ($Mg(H_2PO_4)_2$), magnesium phosphate dibasic ($MgHPO_4$), or magnesium phosphate tribasic ($Mg_3(PO_4)_2$). Given that the levels of $Mg^{2+}$ required to "sequester" the phosphate are very low, it is not necessary to increase the levels of $Mg^{2+}$ in the pool. A particularly advantageous feature of the flocculation capacity of the $Mg^{2+}$ is that a large proportion of the phosphate becomes removed (due to the sequestering capacity of the $Mg^{2+}$ ions) before reacting with chloride that may be present in the pool, which at least partly reduces the production of chloramines and trihalomethanes (THMs).

THMs (e.g. chloroform, bromoform, dibromochloromethane, and bromodichloromethane) are common by-products of chlorination and their total concentration depends upon total organic carbon, the number of swimmers and the water temperature. Individuals are exposed to THMs through ingestion, dermal contact and inhalation and these toxic substances have been recognized as a potential health concern. Although not limiting ourselves to any particular hypothesis, it will be appreciated that an at least partial reduction of the levels of THMs present in a swimming pool will be advantageous. THMs are, for example, considered to be carcinogenic substances that damage the liver, the kidneys and the central nervous system. It has also been proposed that extended exposure to THMs (either in or adjacent to a swimming pool or the like) is associated with adverse reproductive outcomes such as spontaneous abortion, birthweight, neural tube defects, and urinary tract defects. Furthermore, many pool attendants suffer from forgetfulness, fatigue, chronic colds, voice problems, eye irritations, headache, sore throat, eczema and frontal sinus inflammation following extended exposure to THMs.

It has also been found, that $Mg^{2+}$ can be used to at least partly reduce the dependence on $Ca^{2+}$ as water hardness ions. The advantage of using $Mg^{2+}$ instead of $Ca^{2+}$ is that magnesium is less likely to give rise to insoluble carbonates unless the pH and/or alkalinity are particularly high. Even then, tests have shown that magnesium carbonate ($MgCO_3$) scale is much softer and, hence, easier to remove than calcium carbonate ($CaCO_3$) scale.

The use of magnesium ions apart from Its claimed pharmacological benefits, either alone or in combination with potassium chloride and/or sodium chloride, permits disposal of waste water from a swimming pool or the like in a much more environmentally responsible manner compared to the higher levels of electrolytes used in conventional pools. Moreover, given that magnesium is important for plant growth and nutrition, disposal of swimming pool waste water on gardens or the like is beneficial to plants rather than deleterious as otherwise would be the case with sodium chloride which increases the sodicity of the ground to which it is added.

It readily will be apparent to a person skilled in the art that many modifications and variations may be made to the various aspects of the invention without departing from the spirit and scope thereof. The present invention may be further understood in light of the following examples, which are illustrative in nature and are not to be considered as limiting the scope of the invention.

EXAMPLES

Examples 1-6 are non-limiting examples which illustrate a method of treating a swimming pool by introducing $Mg^{2+}$ to a minimum level of 60 ppm and a maximum level of 1000 ppm. The inventors surprisingly discovered that it is possible to introduce $Mg^{2+}$ to the swimming pool using one or more soluble magnesium compounds, including magnesium sulphate, magnesium oxide and magnesium chloride. Benefits associated with the introduction of $Mg^{2+}$ include improved water clarity, reduced environmental damage due to reduced levels of conventional pool chemicals (e.g. sodium chloride), reduced calcium dependence, a reduction in skin and eye conditions, and at least partly reduced levels of disinfection by-products (DBPs) such as chloramines and trihalomethanes (THMs). Specific information, including the $Mg^{2+}$ ppm levels, total electrolyte levels, chloride content and conductivity, may be found in the tables below.

| EXAMPLE 1 | Weight per bag (kg) | Content by weight | | Chloride content | Conductivity Estimate |
|---|---|---|---|---|---|
| | | Active (kg) | Water (kg) | | |
| Magnesium chloride (hexahydrate) | 9 | 4.23 | 4.77 | 3.15135 | 5.175 |
| Potassium chloride | 0.7 | 0.7 | 0 | 0.3332 | 0.6062 |
| Magnesium sulphate (heptahydrate) | 0.3 | 0.147 | 0.153 | 0 | 0.0996 |
| Total | 10 | 5.077 | 4.923 | 3.48455 | 5.8808 |
| Weight per bag (kg) | 10 | | | | |
| Bags per 10,000l | 5.10 | | | | |
| Estimated conductivity in pool | 3000 | | | | |
| Chloride ppm in pool | 1777.6 | | | | |

| Ion | Weight (kg) | Conc' (ppm) |
|---|---|---|
| Mg++ (ppm) | 5.6594833 | 565.94833 |
| K+ (ppm) | 1.870608 | 187.0608 |
| Cl− (ppm) | 17.771024 | 1777.1024 |
| Total | 25.301115 | 2530.1115 |

| EXAMPLE 2 | Weight per bag (kg) | Content by weight | | Chloride content | Conductivity Estimate |
|---|---|---|---|---|---|
| | | Active (kg) | Water (kg) | | |
| Potassium chloride | 6.5 | 6.5 | 0 | 3.094 | 5.629 |
| Magnesium chloride (hexahydrate) | 3.3 | 1.551 | 1.749 | 1.155495 | 1.8975 |
| Magnesium sulphate (heptahydrate) | 0.2 | 0.098 | 0.102 | 0 | 0.0664 |
| Total | 10 | 8.149 | 1.851 | 4.249495 | 7.5929 |
| Weight per bag (kg) | 10 | | | | |
| Bags per 10,000l | 3.95 | | | | |
| Estimated conductivity in pool | 3000 | | | | |
| Chloride ppm in pool | 1679.0 | | | | |

-continued

| Ion | Weight (kg) | Conc' (ppm) |
|---|---|---|
| Mg++ (ppm) | 1.6424219 | 164.24219 |
| K+ (ppm) | 13.453238 | 1345.3238 |
| Cl− (ppm) | 16.792533 | 1679.2533 |
| Total | 31.888194 | 3188.8194 |

| EXAMPLE 3 | Weight per bag (kg) | Content by weight | | Chloride content | Conductivity Estimate |
|---|---|---|---|---|---|
| | | Active (kg) | Water (kg) | | |
| Magnesium chloride (hexahydrate) | 9 | 4.23 | 4.77 | 3.15135 | 5.175 |
| Potassium chloride | 0.7 | 0.7 | 0 | 0.3332 | 0.6062 |
| Magnesium sulphate (heptahydrate) | 0.3 | 0.147 | 0.153 | 0 | 0.0996 |
| Total | 10 | 5.077 | 4.923 | 3.48455 | 5.8808 |

| | |
|---|---|
| Weight per bag (kg) | 10 |
| Bags per 10,000 l | 5.61 |
| Estimated conductivity in pool | 3300 |
| Chloride ppm in pool | 1955.3 |

| Ion | Weight (kg) | Conc' (ppm) |
|---|---|---|
| Mg++ (ppm) | 6.2254317 | 622.54317 |
| K+ (ppm) | 2.0576688 | 205.76688 |
| Cl− (ppm) | 19.548126 | 1954.8126 |
| Total | 27.831227 | 2783.1227 |

| EXAMPLE 4 | Weight per bag (kg) | Content by weight | | Chloride content | Conductivity Estimate |
|---|---|---|---|---|---|
| | | Active (kg) | Water (kg) | | |
| Potassium chloride | 3.6 | 3.6 | 0 | 1.7136 | 3.1176 |
| Magnesium chloride (hexahydrate) | 6 | 2.82 | 3.18 | 2.1009 | 3.45 |
| Magnesium sulphate (heptahydrate) | 0.4 | 0.196 | 0.204 | 0 | 0.1328 |
| Total | 10 | 6.616 | 3.384 | 3.8145 | 6.7004 |

| | |
|---|---|
| Weight per bag (kg) | 10 |
| Bags per 10,000 l | 4.48 |
| Estimated conductivity in pool | 3000 |
| Chloride ppm in pool | 1707.9 |

-continued

| Ion | Weight (kg) | Conc' (ppm) |
|---|---|---|
| Mg++ (ppm) | 3.4001042 | 340.01042 |
| K+ (ppm) | 8.4435082 | 844.35082 |
| Cl− (ppm) | 17.078203 | 1707.8203 |
| Total | 28.921815 | 2892.1815 |

| EXAMPLE 5 | Weight per bag (kg) | Content by weight Active (kg) | Content by weight Water (kg) | Chloride content | Conductivity Estimate |
|---|---|---|---|---|---|
| Potassium chloride | 4.7 | 4.7 | 0 | 2.2372 | 4.0702 |
| Magnesium chloride (hexahydrate) | 5 | 2.35 | 2.65 | 1.75075 | 2.875 |
| Magnesium sulphate (heptahydrate) | 0.3 | 0.147 | 0.153 | 0 | 0.0996 |
| Total | 10 | 7.197 | 2.803 | 3.98795 | 7.0448 |

| | |
|---|---|
| Weight per bag (kg) | 10 |
| Bags per 10,000l | 4.26 |
| Estimated conductivity in pool | 3000 |
| Chloride ppm in pool | 1698.3 |

| Ion | Weight (kg) | Conc' (ppm) |
|---|---|---|
| Mg++ (ppm) | 2.6808527 | 268.08527 |
| K+ (ppm) | 12.310275 | 1231.0275 |
| Cl− (ppm) | 16.983176 | 1698.3176 |
| Total | 31.974304 | 3197.4304 |

| EXAMPLE 6 | Weight per bag (kg) | Content by weight Active (kg) | Content by weight Water (kg) | Chloride content | Conductivity Estimate |
|---|---|---|---|---|---|
| Sodium chloride | 1.036 | 1.036 | 0.000 | 0.628 | 1.036 |
| Magnesium chloride (anhydrous) | 4.767 | 4.767 | 0.000 | 3.550 | 5.832 |
| Magnesium chloride (hexahydrate) | 0.000 | 0.000 | 0.000 | 0.000 | 0.000 |
| Magnesium oxide | 0.466 | 0.466 | 0.000 | 0.000 | 0.155 |
| Potassium chloride | 3.731 | 3.731 | 0.000 | 1.776 | 3.231 |
| Total | 10.000 | 10.000 | 0.000 | 5.955 | 10.254 |

| | |
|---|---|
| Weight per bag (kg) | 10 |
| Bags per 10,000l | 0.98 |
| Estimated conductivity in pool | 1000 |
| Chloride ppm in pool | 580.8 |

-continued

| Ion | Weight (kg) | Conc' (ppm) |
|---|---|---|
| $Mg^{++}$ (ppm) | 1.461 | 146.089 |
| $K^+$ (ppm) | 0.238 | 23.824 |
| $Cl^-$ (ppm) | 5.808 | 580.769 |
| Total | 7.507 | 750.682 |

| Carnallite-1 Components | Formula | Weight % |
|---|---|---|
| Sodium chloride | NaCl | 10.0 |
| Magnesium chloride (anhydrous) | $MgCl_2$ | 46.0 |
| Magnesium chloride (hexahydrate) | $MgCl_2.6H_2O$ | 0.0 |
| Magnesium oxide | MgO | 4.5 |
| Potassium chloride | KCl | 36.0 |
| Water | $H_2O$ | 1.0 |

The invention claimed is:

1. A method for treating a swimming pool, comprising: introducing $Mg^{2+}$ to said swimming pool to a minimum level of 60 ppm and a maximum level of 1000 ppm by adding a magnesium halide at a level of from 250 ppm to 2500 ppm and at least one other soluble magnesium compound at a level of from 150 ppm to 6000 ppm to said swimming pool, wherein the at least one other soluble magnesium compound is not a magnesium halide.

2. The method of claim 1, wherein adding the magnesium halide includes adding magnesium chloride.

3. The method of claim 1, wherein adding the at least one other soluble magnesium compound includes adding a soluble magnesium compound selected from the group consisting of magnesium sulphate, magnesium borate, magnesium hydroxide, magnesium oxide, anhydrous magnesium sulphate, magnesium sulphate heptahydrate, and combinations thereof.

4. The method of claim 1, further comprising introducing 1 to 4000 ppm of a soluble potassium salt to the swimming pool.

5. The method of claim 1, wherein introducing said $Mg^{2+}$ includes forming $Mg^{2+}$ by electrolysis of one or more soluble magnesium compounds.

6. The method of claim 1, wherein introducing said $Mg^{2+}$ includes adding carnallite to the swimming pool.

7. A method for treating a swimming pool, comprising: introducing $Mg^{2+}$ to said swimming pool to a minimum level of 60 ppm and a maximum level of 1000 ppm by adding magnesium chloride at a level of from 250 ppm to 2500 ppm and magnesium sulphate at a level of from 300 ppm to 3000 ppm to said swimming pool.

8. The method of claim 7, further comprising adding magnesium hydroxide to said swimming pool.

9. The method of claim 8, wherein the magnesium hydroxide is added at a level of from 160 ppm to 1400 ppm.

10. The method of claim 7, further comprising adding magnesium oxide to said swimming pool.

11. The method of claim 10, wherein the magnesium oxide is added at a level of from 120 ppm to 900 ppm.

12. A method for treating a swimming pool, comprising: introducing $Mg^{2+}$ to said swimming pool to a minimum level of 60 ppm and a maximum level of 1000 ppm by adding magnesium chloride and one or more of magnesium hydroxide or magnesium oxide to said swimming pool.

13. The method of claim 12, wherein the magnesium chloride is added at a level of from 250 ppm to 2500 ppm.

14. The method of claim 12, wherein the magnesium hydroxide is added at a level of from 160 ppm to 1400 ppm.

15. The method of claim 12, wherein the magnesium oxide is added at a level of from 120 ppm to 900 ppm.

16. The method of claim 12, further comprising adding magnesium sulphate to said swimming pool.

17. The method of claim 16, wherein the magnesium sulphate is added at a level of from 300 ppm to 3000 ppm.

* * * * *